United States Patent [19]
Leeson

[11] Patent Number: 5,468,103
[45] Date of Patent: Nov. 21, 1995

[54] LOCKING SYSTEM WITH AN IDENTIFICATION MARK FOR THREADED FASTENERS

[75] Inventor: Plato J. Leeson, Rockford, Ill.

[73] Assignee: Yonco Corporation, Rockford, Ill.

[21] Appl. No.: 286,637

[22] Filed: Aug. 5, 1994

[51] Int. Cl.[6] .............................. F16B 39/04; F16B 39/20; B23P 19/04

[52] U.S. Cl. .............................. 411/87; 411/361; 411/966; 29/433

[58] Field of Search .............................. 411/87, 361, 966; 29/433, 515, 816; 403/212; 292/307 A, 307 B, 312, 325

[56] References Cited

U.S. PATENT DOCUMENTS

| | | | |
|---|---|---|---|
| 588,100 | 8/1897 | Brooks | 292/312 |
| 919,316 | 4/1909 | Brooks | 292/312 |
| 5,052,094 | 10/1991 | Plasse et al. | 29/252 |
| 5,116,178 | 5/1992 | Lerman et al. | 411/87 |
| 5,127,144 | 7/1992 | Plasse et al. | 29/252 |
| 5,152,043 | 10/1992 | Plasse et al. | 29/252 |
| 5,167,059 | 12/1992 | Plasse et al. | 29/433 |
| 5,214,832 | 6/1993 | Koehler et al. | 29/268 |

OTHER PUBLICATIONS

"Maintainability/Human Factors Integral to Flight–Line Tool Design", article by Schmidt et al., pp. 18–21, Jetservice Fall/Winter 1992, Published by G.E.

Primary Examiner—Neill R. Wilson
Attorney, Agent, or Firm—Leydig, Voit & Mayer, Ltd.

[57] ABSTRACT

A locking system including a combination of a multistrand locking wire and a ferrule bearing an identification mark for preventing threaded fasteners on a device from loosening due to vibration, each of the fasteners having an aperture for receiving the locking wire. The ferrule with an identification mark serves as a seal for identification and for preventing tampering with the device. The identification mark can be either premarked on the ferrule before system installation, or be applied to the ferrule during system installation, such as by shaping the crimped deformation on the ferrule into an identification pattern.

17 Claims, 3 Drawing Sheets

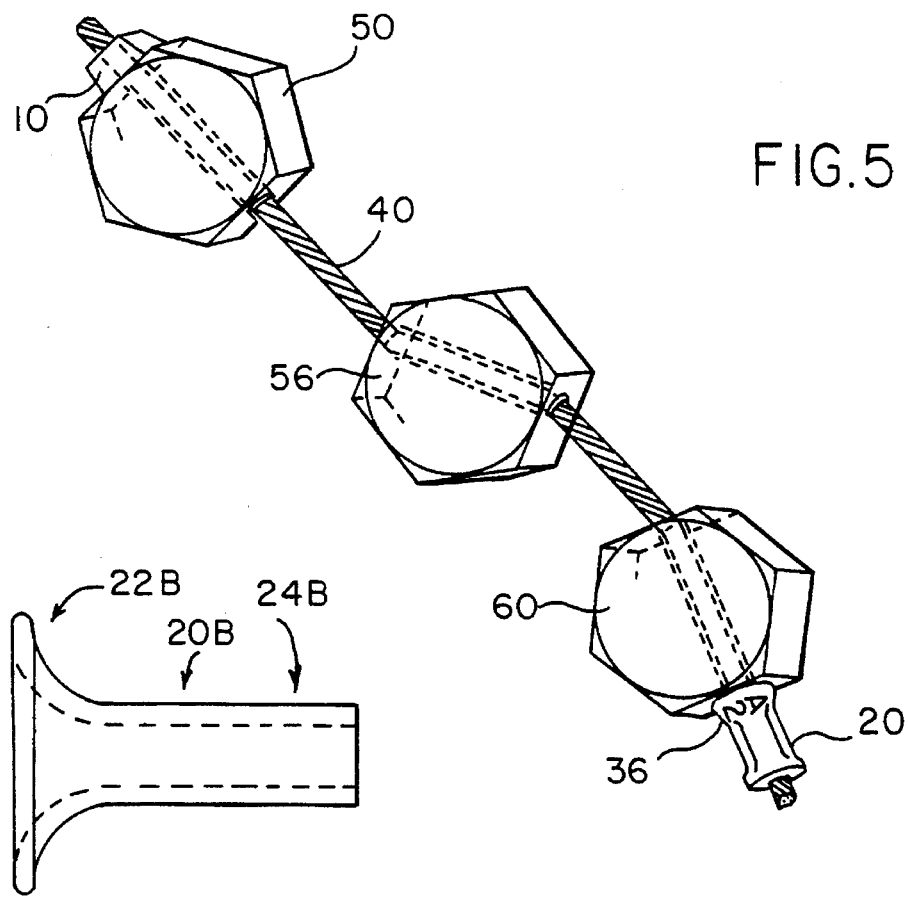
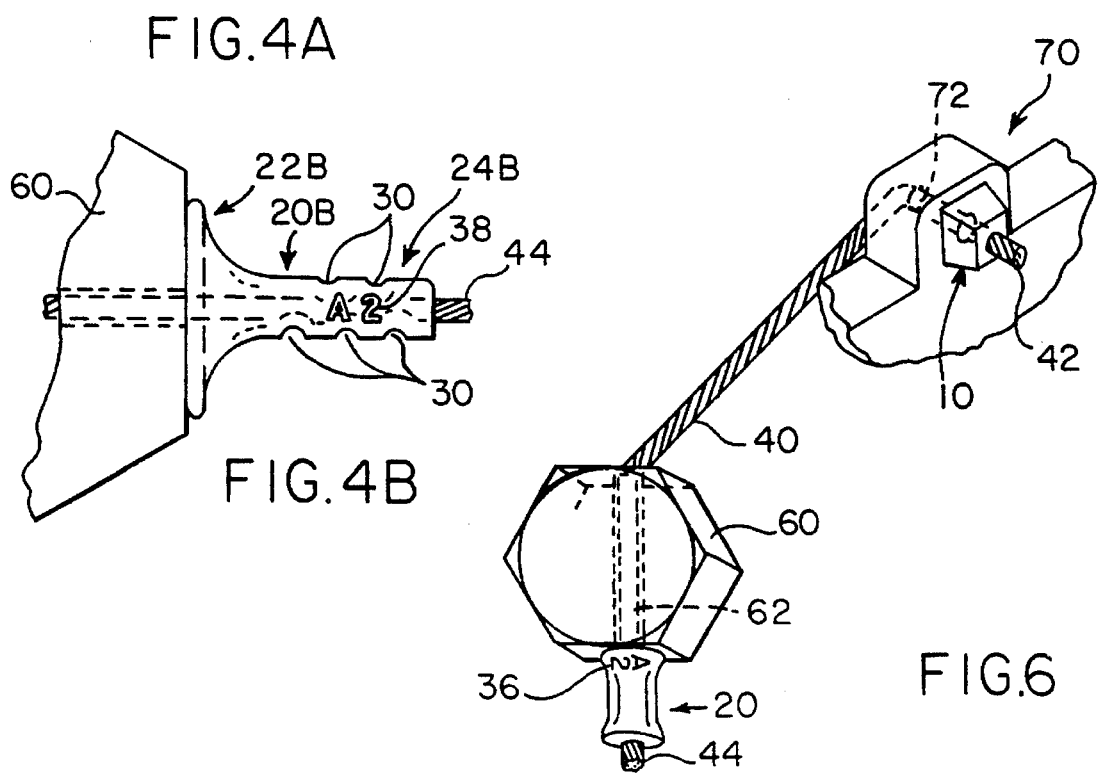

5,468,103

LOCKING SYSTEM WITH AN IDENTIFICATION MARK FOR THREADED FASTENERS

FIELD OF THE INVENTION

The present invention is related generally to a locking system for preventing the loosening of threaded fasteners on a device due to vibration, and more particularly to such systems which provide a seal for identification and for preventing tampering of the device.

BACKGROUND OF THE INVENTION

Many types of machinery are subject to vibration, which may cause the loosening of threaded fasteners in the machinery. In many applications, such as turbine engines, a loosened fastener can cause catastrophic damage to the machinery. It is therefore necessary to lock the threaded fasteners in position so that they can not rotate in a direction which would tend to loosen and disengage them.

One locking system in the prior art utilizes two solid locking wires. Each of the fasteners to be locked has an aperture to receive a locking wire, and has one of the two wires passing through it aperture. The two wires are twisted together between fasteners and tensioned to prevent the fasteners from rotating in the loosening direction. The ends of the two wires are also twisted together and bent into a pigtail shape to prevent separation.

Instead of using two solid wires, a single solid wire may also be used to implement the twisted solid wire locking system. In that case the wire is first threaded through the aperture of the first fastener in the locking sequence. The wire is then doubled back around that fastener and the two halves of the wire are used in the same way as the two wires in the double wire system described above.

Another locking system in the prior art utilizes a single flexible multi-strand wire which is threaded through the aperture of each of the fasteners to be locked together. The wire is placed under tension and the tension is maintained by affixing a crimped-on body on each end of the wire to prevent the ends of the wires from going through the terminal fasteners. This single flexible wire system has many advantages over the twisted solid wire system, such as much easier installation and more uniform tension in the wire between fasteners.

Conventionally, after a locking system is put in place, a seal may be installed on the locking system. The seal is normally a malleable metal tag with an identification pattern impressed on it. The metal tag is normally installed on a section of the wire between two fasteners and crimped into position in such a way that the seal can not be removed without either destroying the seal or destroying the locking wire. In a solid wire locking system, a tag can also be crimped onto the twisted pigtail-shaped end of the locking wire to prevent separation of the ends.

The metal tag used as a seal can have a variety of configurations. For instance, a tag to be used on a multi-strand flexible locking wire may be a piece of short soft-metal tube which is to be slid on the wire during system installation between two fasteners. For a solid locking wire system the tag can be a small piece of sheet metal with two edges rolled up to form two parallel apertures. The tag is mounted between two threaded fasteners, with the solid locking wires threaded through the apertures and twisted before and after the tag.

In the prior art the identification mark on a metal tag used as a seal in a locking system is often created in the crimping process by using a crimp die which has an engraved pattern on the crimping surface. Crimping the tag with die leaves the pattern on the tag.

In summary, the seal in a locking system serves many purposes. One important purpose of using a seal is to provide a means of identification. For instance, the seal can be used for identifying the manufacturer, the individual assembler which has installed the locking system, or the time and location of the installation.

Another important purpose of using a seal is to allow the manufacturer to assure that a given device has not been tampered with. If someone has tampered with the device, they would have had to remove the fastener. In order to remove the fasteners they would have to remove the locking system which requires destroying either the locking wire or the seal. If the seal is configured in that it is not reusable, (i.e. the seal can not be removed from the locking wire intact and then used on another locking wire), the tampering cannot be disguised by installing another locking system on the device and attaching the original seal on the new locking system.

The conventional way of affixing a seal to the locking system is not entirely satisfactory from at least this view point. The identification mark is often on a flag which is separate from the aperture or apertures which receive the lock wire, so that it may be possible to disengage the lock wire from the apertures without comprising the integrity of the identification mark. As further drawbacks, adding a metal seal piece to the locking system increases the weight of the device, which is not desirable in aircraft applications. Mounting a seal on the locking wire and crimping the seal to engage the locking wire also add two more steps to the installation of the locking system, thereby increasing the effort required for system installation.

SUMMARY OF THE INVENTION

In view of the foregoing, it is a general object of this invention to provide a locking system combined with an identification system which is highly integrated, efficient to install, and substantially tamper proof.

In this respect, it is one feature of the present invention to provide a single flexible locking wire system which utilizes a ferrule with an identification mark to serve the function of a seal. Utilizing an existing component of the locking system for a seal eliminates the need to install a separate seal, resulting in reduced weight of the system and simplified installation process.

It is a related feature of the present invention to use a ferrule with a pre-marked identification mark. It is a another related feature that the ferrule can be marked when it is installed on the locking wire by shaping crimped deformations into an identification pattern. By either using a pre-marked ferrule or impressing a mark on the ferrule in the crimping step, a means for identification and prevention of tampering is provided for the locking system without adding any extra step to the installation of the locking system.

It is a further feature of the invention that the ferrule is crimped in place on the lock wire to service a locking fastener, and the identification mark is associated sufficiently closely with the crimp that the ferrule can not be removed without substantially compromising the identification mark, thereby deterring any attempt to remove and reuse the marked ferrule.

Locking systems of the type described here are often used in mechanical systems which require a high degree of reliability. An important example is the aircraft engine. Such engines are inspected and serviced regularly, and it is important that they operate reliably between inspections. Lock wire systems are important in such applications not only because they prevent fasteners from vibrating free, but also because they provide an immediate visual indication of tampering. For example, an unauthorized party cannot gain access to an aircraft fuel control without removing the lock wire system. The tampering would be immediately and visually apparent unless the tamperer took the trouble to install a replacement lock wire system. Utilization of an identification mark, not easily duplicated, on a lock wire system can be useful for detecting even these instances.

During the normal service life of an aircraft engine, most of its components will be disassembled and serviced, often times by an entity other than the original manufacturer, such as the operating airline. Identification systems are useful to trace problems which are attributed to a particular aircraft component, to the entity which was last responsible for assembling the component. Thus, it is typical for the original equipment manufacturer and for certified service organizations to each be provided with unique identification marks. Whenever one of those organizations assembles or reassembles a component, a lock wire system is put in place along with an identification mark which identifies the organization which has accomplished the assembly. Assigning responsibility for component failures thus become much more reliable, but it is only more reliable if the identification mark applied to the lock wire cannot be reused or is not easily duplicated.

Other objects and advantages will become apparent from the following detailed description when taken in conjunction with the drawings, in which:

BRIEF DESCRIPTION OF THE DRAWINGS

FIG. 4A shows a cross section view of a thin-walled ferrule with one flared end;

FIG. 4B shows a crimped-on identification mark on a thin-walled ferrule with a flared end installed in a locking system;

FIG. 5 shows three fasteners connected with a locking system of the present invention; and FIG. 6 illustrates a threaded fastener connected to a tab by the locking system according to the present invention, the tab serving the function of an anchor.

DETAILED DESCRIPTION OF THE PREFERRED EMBODIMENTS

While the invention will be described in connection with certain preferred embodiments, there is no intent to limit it to those embodiment. On the contrary, the intent is to cover all alternatives, modifications, and equivalents included within the spirit and scope of the invention as defined by the appended claims.

Figure 1:
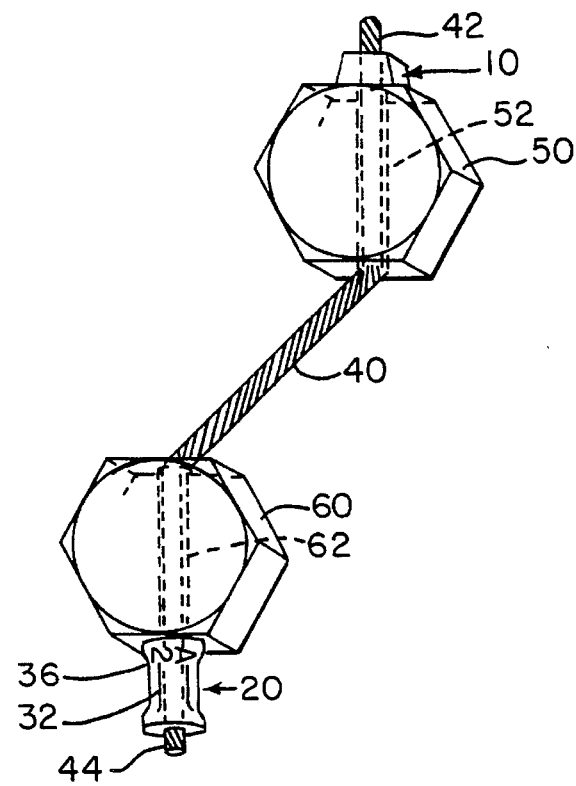
FIG. 1 illustrates two threaded fasteners locked in position with an embodiment of the locking system of the present invention.

Turning now to the drawings, FIG. 1 shows two threaded fasteners locked in position and illustrating an embodiment of the locking system of the present invention. Each of the threaded fasteners 50, 60 has an aperture 52, 62 which can accept a locking wire 40. The apertures 52, 62 of the fasteners 50, 60 should be of a size sufficiently close to the diameter of the locking wire 40 to adequately receive the locking wire.

The locking system as illustrated in FIG. 1 includes a locking wire 40 and a ferrule 20. The locking wire is a flexible wire having multiple strands of a material with suitable characteristics such as durability and strength. In the preferred embodiment the locking wire is a flexible multi-strand steel cable. To the first end 42 of the locking wire is affixed a restraining head 10 which is sufficiently large to interfere with the fastener aperture 52. The second end 44 of the wire is a free end before installation of the locking system. During installation the second end 44 is threaded through the aperture of each of the fasteners 50, 60 in a predetermined direction so that when the wire is tensioned the tension in the wire opposes loosening of the fasteners so that they stay locked. The tension is maintained by a ferrule 20 which is secured onto the locking wire 40 to prevent the second end 44 of the wire from being pulled through the aperture 62 of the fastener 60. The ferrule 20 as shown in FIG. 1 bears an identification mark 36 which is located in close proximity to the deformations 32 which form the crimped connection.

Figure 2:
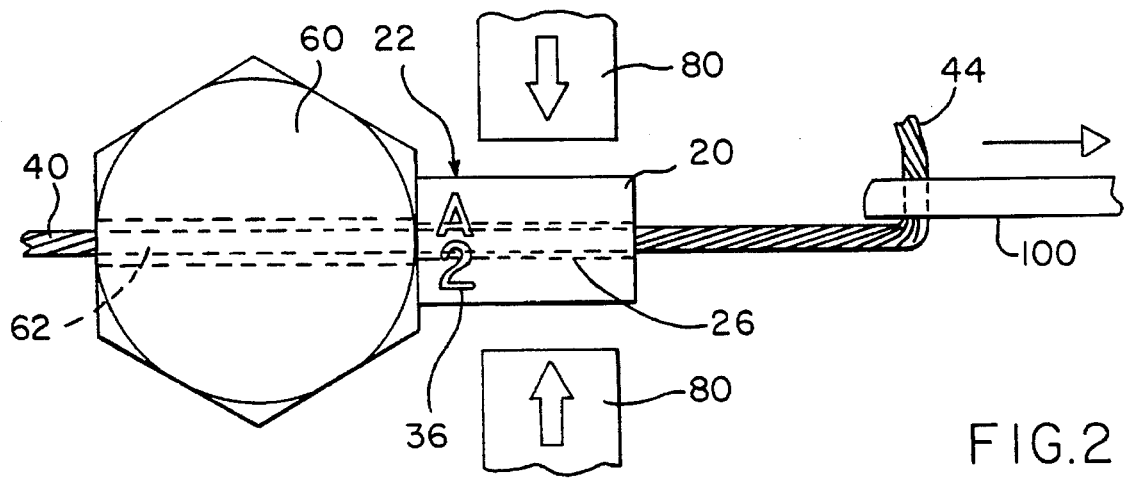
FIG. 2 illustrates the installation of a ferrule on the locking wire, the ferrule having a premarked identification mark.

FIG. 2 illustrates the installation of the ferrule on the locking wire to form a complete locking system after the locking wire 40 has been threaded through the apertures 52, 62 (FIG. 1) of the fasteners 50, 60 (FIG. 1). The ferrule 20 has an aperture 26 for accepting the locking wire 40. The ferrule 20 is put on the wire 40 by inserting the second end 44 of the wire into the aperture 26 of the ferrule 20. The tensioning member 100 in FIG. 2 illustrates schematically the application of tension to the locking wire. While the wire 40 is tensioned by pulling on the second end 44 of the wire, the ferrule 20 is forced into contact with the last fastener 60 and the ferrule is then deformed by a crimping tool to secure the ferrule on the wire. The crimping tool, which is schematically illustrated in FIG. 2 as two crimp dies 80, may be either a hand tool or a power tool. The tension in the wire 40 is then maintained between the restraining head 10 (FIG. 1) on the first end 42 (FIG. 1) of the wire and the ferrule 20. The adequate tension in the wire depends on the size of the wire, size of the fastener, and other factors of the application, and may be in the range of 5 to 50 pounds.

The ferrule used in the locking system can have different sizes and shapes. For instance, the ferrule can have a square or round cross section; the ferrule can have a shape like a round bead or like a short section of a cylindrical tube. Regardless of the shape of the ferrule, in order to restrain the end of the wire from going through the fastener, the end 22 of the ferrule engaging the fastener 60 has to be of a dimension sufficient to reliably interfere with the aperture 62 of the fastener. The ferrule can be made of different materials as long as the ferrule can be crimped to adequately engage the locking wire. In the preferred embodiment of the present invention, the ferrule is of malleable metal having a generally annular cross section.

As an important feature of the present invention, the ferrule 20 used in the locking system shown in FIG.1 bears an identification mark. The ferrule thus serves the function of a seal, i.e. providing a means for identification and for prevention of tampering with the device on which the fasteners are mounted. For the identification purpose, the identification mark can be used to identify a variety of things, such as the organization which installs the locking system, the person or department within the organization which did the installation, the place and time of the installation, customary features installed in the device, purchaser of the device, etc.

In order to serve the purpose of preventing tampering of the device, the ferrule should be non-reusable. The ferrule is of such construction and is crimped on the wire in such a way that removing it from the locking wire practically requires destruction of the ferrule. In this way the ferrule can be used only once and can not be reused in another locking system. The tamperer therefore can not hide the tampering by installing a new locking system using the original marked ferrule.

The prevention of tampering is also assisted by locating the identification mark in sufficiently close proximity to the deformations which form the crimp that, even if it is possible to remove the ferrule from the locking wire, the process of removal will compromise the identification. Thus, in contrast to locating identification marks on flags attached to cylindrical members through which the lock wire passes, in accordance with the invention, the identification mark is located directly on the body which is the crimped member of the ferrule. In accordance with the invention the crimp must be sufficiently positive to lock the ferrule to the locking wire, because the ferrule serves the dual function of locking (i.e. holding the tension in the lock wire) and identification. With the identification mark tightly associated with the crimps which form the actual lock, the possibility of reusing the components, particularly the identification ferrule, in a system after tampering, is substantially reduced, if not completely eliminated.

In some applications, it may be desirable to use identification ferrule on each end of the locking wire, not only for the ferrule 20, but also in place of the restraining head 10. However, the system is substantially tamper proof even when only one end of the locking wire is marked with identification. More particularly, using conventional locking wire systems, the locking wire is cut right near the edge of the ferrule, so there is no substantial protrusion of locking wire beyond the ferrule. Thus, if one were to remove the restraining head 10 and attempt to reuse the system by replacing a part equivalent to restraining head 10, keeping the original identification ferrule 20 in place, it would not be possible to achieve the appropriate tension, because there would be insufficient wire available to grip for tensioning the wire before fixing the restraining head 10 in place. Thus, while it may appear that the locking wire is cut near the end of the ferrule for purposes of neatness, that feature also adds to the security of the system by preventing reuse of components of the locking system which might include an undamaged identification ferrule locked in place on the end of the original locking wire, since that original locking will be too short for reinstallation.

The identification mark on the ferrule may take the form of numbers, letters, simple shapes or patterns, etc. There are many different methods available to apply an identification mark to a ferrule. For instance, the mark can be applied by chemically etching or mechanically stamping the ferrule, or by any other method known to workers skilled in the art.

Instead of shaping the material of the ferrule into identification marks, the mark can also be formed by applying external materials on the ferrule, such as by painting the ferrule. When the marks are painted on the ferrule, in order to prevent counterfeiting, the paint used may have to be of a special kind and of limited availability.

The identification mark on the ferrule can be premarked before the ferrule is installed in the locking system. For example, the ferrule 20 shown in FIG. 2 has a premarked identification mark. Premarked ferrule can be mass produced in a factory and then distributed to workers for use in locking systems. A worker may have many bins containing ferrules with different identification marks. During the installation of a locking system a ferrule with a proper mark is selected and installed in the system.

There are certain advantages to using a ferrule with a factory marked identification mark. For instance, mass production can reduce the per unit cost of marking a ferrule, as compared to marking individually each ferrule to be used in a locking system by the worker. There are also many techniques available in a factory for marking a ferrule, such as etching or laser marking, which are normally not available to a worker installing the locking system. Premarked ferrules can come in with many different types of marks, while a worker may be able to apply only a limited types of marks due to limited tooling. Using a factory marked ferrule may also reduce the effort required to install a locking system because the worker does not have to perform the step of marking the ferrule.

Instead of using factory marked ferrules, the identification mark on the ferrule can also be applied to the ferrule as part of the system installation process. For instance, the ferrule can be marked right before it is installed in the system by, e.g., stamping a mark on the ferrule. The ferrule can also be marked after it is installed on the locking wire by, e.g., applying a few dabs of paint on the ferrule, preferably on or in the crimped indentations. Marking the ferrule right before or after it is installed in the system, however, introduces the additional step of marking into the installation of the locking system.

Figure 3A:
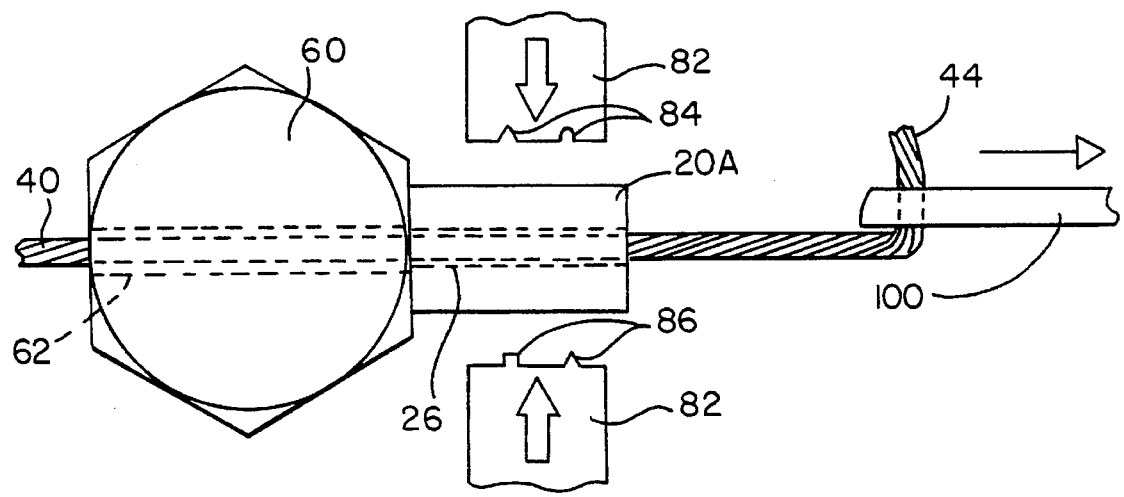
FIG. 3A illustrates the marking of a ferrule in a crimping step which secures the ferrule to a locking wire.
Figure 3B:
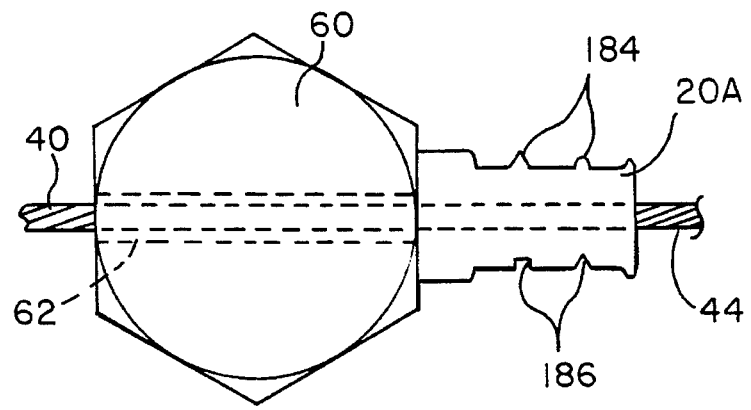
FIG. 3B illustrates a marked ferrule after the crimping step.

One convenient way to apply an identification mark to the ferrule without an additional marking step is to impress the identification mark on the ferrule in the crimping step. FIG. 3A a illustrates schematically the marking of the ferrule in the crimping step. The crimp dies 82 as shown in FIG. 3A have indentations 84 and raised areas 86 on the crimping surface of the crimp dies. In the crimping step, the dies 82 press on the ferrule 20A to deform the ferrule to engage the locking wire 40, and at the same time leave on the deformed ferrule a "negative image" 184, 186 of the indentations 84 and raised areas 86. The ferrule 20A after crimping is illustrated in FIG. 3B. Thus the ferrule can be marked in the crimping step by shaping the indentations or raised areas on the crimp dies into an identification pattern which is impressed on the ferrule by crimping.

A preferred type of ferrule useful with the present invention is described in Leeson application filed concurrently herewith and entitled LOCKING SYSTEM FOR THREADED FASTENERS, Ser. No. 08/286,548, filed Aug. 5, 1994. As illustrated in FIG. 4A, the ferrule 20B has a thin walled construction and two ends 22B, 24B of different cross sectional diameter. The smaller end 24B, which is a section of a cylindrical tube, flares out smoothly into a larger end 22B. The larger end 22B has a diameter large enough to interfere with the apertures 52, 62 (FIG. 1) of the fasteners. The diameter of the smaller end 24B is substantially smaller than the diameter of the larger end 22B.

When a ferrule 20B shown in FIG. 4A is used in the locking system, the ferrule has to be installed on the wire with the larger end 22B facing the last fastener in the locking sequence. This is because the smaller end may not be large enough to reliably interfere with the aperture in the fastener. As compared to the ferrule of FIG. 1, the thin wall of the ferrule 20B is easier to deform, making it easier to impress an identification pattern on the ferrule in the crimping step. FIG. 4B shows such a thin-walled flared-ended ferrule 20B with crimped deformations 30 and an identification pattern 38 impressed on the ferrule in the crimping step. It is, of course, possible to use the other previously described form of marking with the ferrule of FIG. 4A.

While FIG. 1 shows only two threaded fasteners 50, 60, more fasteners can be locked with a locking wire according to the same principle by threading the wire through the aperture of each of the fasteners to be locked in a predetermined sequence. FIG. 5 shows a locking system installed on three fasteners. The locking wire 40 is threaded through each of the fasteners 50, 56, 60. The two sections of the wire 40 on the two sides of the fastener 56 in the middle are tensioned and the tension prevents the fasteners from loosening.

As illustrated in FIG. 1, each of the fasteners 50, 60 serves as an anchor for the other fastener in that each fastener is connected by the wire 40 to the other fastener to prevent the former from loosening. Instead of using a fastener as an anchor, an anchor can be a fixed member on the device of which the fasteners are to be locked. For instance, as illustrated in FIG. 6, a fixed tab 70 with an aperture 72 may be used as an anchor.

As shown in FIG. 1, the first end 42 of the locking wire 40 has a restraining head 10 affixed to it. The restraining head 10 may be a crimped-on body which is of a size sufficient to interfere with the fastener aperture 52. Such a crimped-on head can be factory installed on the locking wire. The restraining head may also be another ferrule with an identification mark like the ferrule 20 on the second end 44 of the wire. The restraining head may also comprise a localized deformed section of the wire. Such a head can be formed by working the end section of the wire, or by any other ways known to people skilled in the art.

It will now be appreciated that what has been provided is locking system for threaded fasteners comprising a multistrand flexible locking wire and a ferrule with an identification mark and utilizing the ferrule to serve the function of a seal. By utilizing a component of the locking system as a seal, no extra seal piece is needed, resulting in reduced weight of the system and reduced effort of system installation. By using a premarked ferrule or by impressing an identification mark on the ferrule during the crimping step, a means for identification and prevention of tampering is provided adding steps to the system installation.

What is claimed is:

1. A locking system for connecting an anchor and at least one threaded fastener for preventing loosening of the fastener, each of the anchor and the fastener having a body and a lock wire aperture therethrough of a size sufficient to closely receive a locking wire, the system comprising:

a flexible multi-strand wire having first and second ends, the first end of the wire having a restraining head of a dimension sufficient to interfere with the lock wire apertures, the wire being threaded through each of the lock wire apertures in a predetermined direction, and a ferrule having a cylindrical barrel carrying an identification mark, the ferrule having an axial aperture through which the second end of the locking wire is threaded, the locking wire being tensioned between the restraining head on the first end and the ferrule on the second end, crimped deformations on the ferrule engaging the strands of the locking wire for securely locking the ferrule to the locking wire, the deformations being associated with the identification mark sufficiently closely that the ferrule cannot be removed from the locking wire without compromising the identification marks.

2. A locking system as in claim 1, wherein the anchor comprises a said second fastener, and the wire being threaded through the first and second fasteners.

3. A locking system as in claim 1, wherein the restraining head on the first end of the wire is a second said ferrule with an identification mark.

4. A locking system as in claim 1, wherein the identification mark on the ferrule is premarked before the installation of the locking system.

5. A locking system as in claim 1, wherein the identification mark is applied to the ferrule during the installation of the locking system.

6. A locking system as in claim 5, wherein the identification mark on the ferrule comprises crimped deformations shaped into a pattern for identification.

7. A locking system as in claim 6, wherein the ferrule has a smaller end smoothly flared into a larger end, the larger end having a dimension sufficient to interfere with the lock wire apertures, the smaller end having a dimension substantially smaller than the larger end, the larger end facing the body closest to the second end of the wire.

8. A locking system as in claim 1, wherein the ferrule has a smaller end smoothly flared into a larger end, the larger end having a dimension sufficient to interfere with the lock wire apertures, the smaller end having a dimension substantially smaller than the larger end, the larger end facing the body closest to the second end of the wire.

9. A locking system as in claim 1, wherein the second end of the locking wire has no substantial protrusion beyond the ferrule.

10. A locking method for connecting an anchor and at least one threaded fastener for preventing loosening of the fastener, each of the anchor and the fastener having a body and a lock wire aperture therethrough of a size sufficient to closely receive a locking wire, the method comprising the steps of:

providing a flexible multi-strand locking wire having a first end with a restraining head and a free second end, threading the second end of the wire through each of the lock wire apertures in a predetermined direction, threading the second end of the wire through an axial aperture in a ferrule, tensioning the locking wire by pulling the second end while forcing the ferrule into contact with the body closest to the second end of the wire so that the restraining head on the first end of the locking wire is pulled against the body closest to the first end of the wire, while holding the tension in the wire, crimping the ferrule to form deformations on the ferrule to secure the ferrule to the locking wire, and in conjunction with the crimping step above, securing on the locking wire an identification mark located on the ferrule for identification and for prevention of tampering, the identification mark being associated with the deformations formed in the crimping step sufficiently closely that the ferrule cannot be removed from the locking wire without compromising the identification marks.

11. A locking method as in 10, wherein the anchor is a second said threaded fastener, and the locking wire is threaded through the lock wire apertures of the first and second fasteners.

12. A locking method as in 10, wherein the step of threading the locking wire through a ferrule includes providing a ferrule with a premarked identification mark and threading the locking wire through the said ferrule.

13. A locking method as in 10, wherein the crimping step includes impressing on the ferrule a pattern for identification.

14. A locking method as in 13, wherein the ferrule is a thin walled cylinder flared at one end to produce a thin-walled smaller end smoothly flaring into a larger end of a dimension sufficient to reliably interfere with the lock wire apertures, and the step of threading threads the locking wire into the ferrule with the larger end of the ferrule facing the body closest to the second end of the wire.

15. A locking method as in 10, wherein the ferrule is a thin walled cylinder flared at one end to produce a thin-walled smaller end smoothly flaring into a larger end of a dimension sufficient to reliably interfere with the lock wire apertures, and the step of threading threads the locking wire into the ferrule with the larger end of the ferrule facing the body closest to the second end of the wire.

16. A locking method as in 10, wherein the step of providing a locking wire includes crimping a second said ferrule onto the first end of the wire to form the restraining head, and in the course of crimping securing to the locking wire an identification mark located on the restraining head.

17. A locking method as in claim 10, wherein the method comprises a further step of severing the excess of the second end of the locking wire near the edge of the ferrule after securing the ferrule to the locking wire in the crimping step.

* * * * *